US011288300B2

(12) United States Patent
Rings et al.

(10) Patent No.: US 11,288,300 B2
(45) Date of Patent: Mar. 29, 2022

(54) TECHNIQUES AND COMPONENTS TO FIND NEW INSTANCES OF TEXT DOCUMENTS AND IDENTIFY KNOWN RESPONSE TEMPLATES

(71) Applicant: Capital One Services, LLC, McLean, VA (US)

(72) Inventors: Joerg Rings, Chicago, IL (US); William Thomas Romano, Riverview, FL (US); Andre Gatorano, Palatine, IL (US)

(73) Assignee: Capital One Services, LLC, McLean, VA (US)

( * ) Notice: Subject to any disclaimer, the term of this patent is extended or adjusted under 35 U.S.C. 154(b) by 299 days.

(21) Appl. No.: 16/706,270

(22) Filed: Dec. 6, 2019

(65) Prior Publication Data

US 2021/0042343 A1    Feb. 11, 2021

Related U.S. Application Data

(62) Division of application No. 16/536,993, filed on Aug. 9, 2019, now Pat. No. 10,540,381.

(51) Int. Cl.
| | |
|---|---|
| *G06F 16/35* | (2019.01) |
| *G06F 16/93* | (2019.01) |
| *G06K 9/00* | (2022.01) |
| *G06K 9/62* | (2022.01) |
| *G06F 16/33* | (2019.01) |

(52) U.S. Cl.
CPC .......... *G06F 16/353* (2019.01); *G06F 16/334* (2019.01); *G06F 16/93* (2019.01); *G06K 9/00483* (2013.01); *G06K 9/6215* (2013.01); *G06K 2209/01* (2013.01)

(58) Field of Classification Search
CPC ....... G06F 16/353; G06F 16/334; G06F 16/93
See application file for complete search history.

(56) References Cited

U.S. PATENT DOCUMENTS

| | | | |
|---|---|---|---|
| 2019/0251150 A1* | 8/2019 | Vinay | ........................ G06F 8/38 |
| 2019/0266257 A1* | 8/2019 | Natchu | ................... G06F 16/95 |

* cited by examiner

*Primary Examiner* — Loc Tran
(74) *Attorney, Agent, or Firm* — Kacvinsky Daisak Bluni PLLC

(57) ABSTRACT

Disclosed are examples of a system, techniques and non-transitory computer-readable storage medium that enable the selection of a response document template for generating an appropriate response to notification document. Respective components may generate an electronic document from the notification document. A common theme between two or more of the electronic documents may be identified. The electronic documents identified as having the common theme may be grouped in a notification document corpus. The notification document corpus may be analyzed with reference to received notification documents stored in a document repository. Based on results of the analysis, a template of a notification response document appropriate for responding to a specific notification document received by the enterprise may be selected. The selected response document template may be forwarded to a client device for further processing.

20 Claims, 6 Drawing Sheets

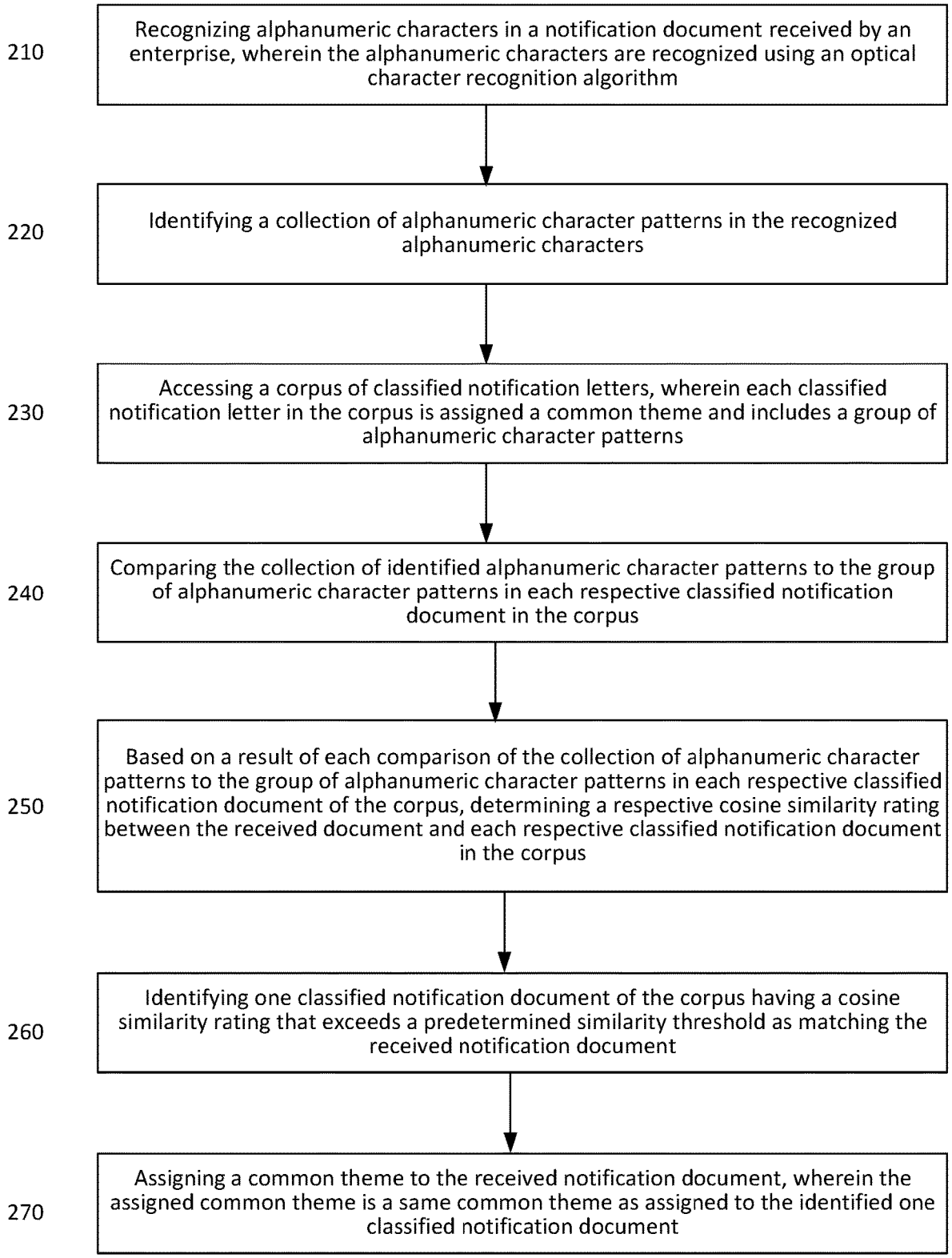

310 — Identify, by evaluating machine-readable data of a number of notification documents, a common theme between two or more notification documents of the number of notification documents 320 — Store in a memory notification documents identified as sharing the common theme 330 — Identify similar machine-readable data from each notification document in the corpus of notification documents 340 — Group, according to a clustering algorithm, notification documents in the stored corpus having the identified similar machine-readable data in a respective cluster of a number of clusters until all notification documents in the stored corpus have been grouped into a respective cluster 350 — Determine, for each respective cluster of the number of clusters, an intrinsic similarity of notification documents grouped in each respective cluster 360 — Remove a cluster having a pair of notification documents with a highest intrinsic similarity value from the number of clusters 370 — Does any cluster have a highest intrinsic similarity value? —YES→ (loops back to 340)

NO

380 — Assigning a common theme to the cluster based on a characterization of the notification documents included in the cluster 390 — Select a response document template appropriate for responding to notification documents received by the enterprise that share the assigned common theme

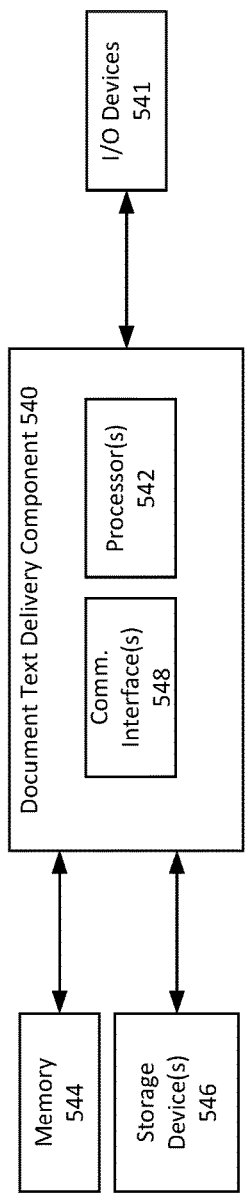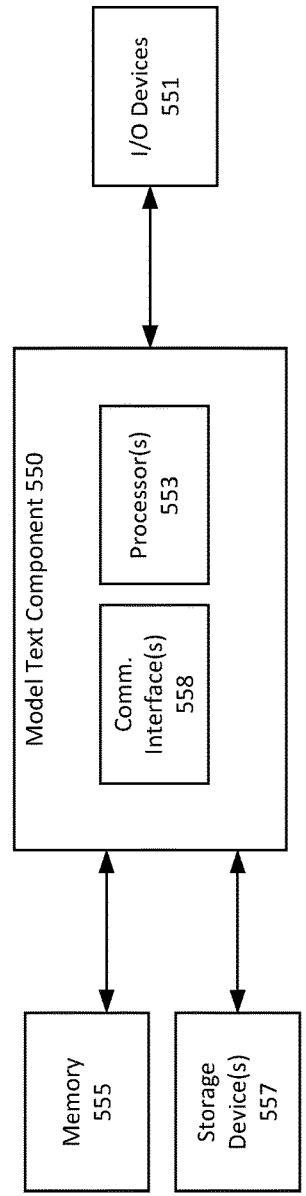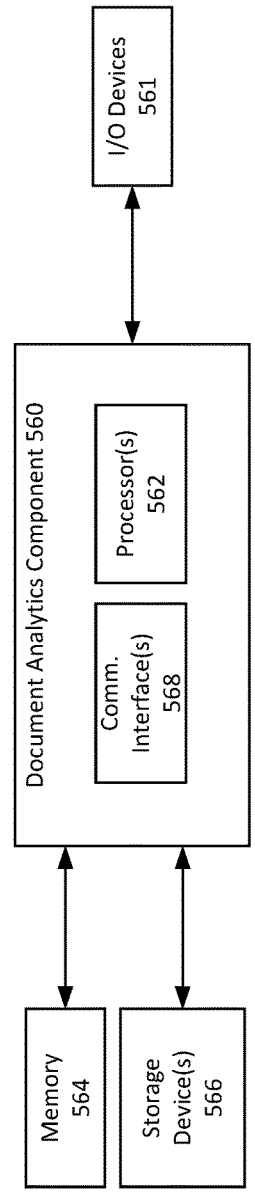

… (1)

TECHNIQUES AND COMPONENTS TO FIND NEW INSTANCES OF TEXT DOCUMENTS AND IDENTIFY KNOWN RESPONSE TEMPLATES

RELATED APPLICATION

This application is a divisional of U.S. patent application Ser. No. 16/536,993, titled "TECHNIQUES AND COMPONENTS TO FIND NEW INSTANCES OF TEXT DOCUMENTS AND IDENTIFY KNOWN RESPONSE TEMPLATES" filed on Aug. 9, 2019. The entire contents of the aforementioned application are incorporated herein by reference.

BACKGROUND

Enterprises receive a large volume of documents from many persons and organizations. The subject matter of the documents may also vary greatly from one document to another. Enterprises, such as financial institutions, may have regulatory and statutory requirements to evaluate the received documents and generate an appropriate response within a set timeframe. Current systems often require agents to read each of the received letters to ensure the legitimacy of the letter and prepare the appropriate response. Some of the letters may be formulaic and have a format that is somewhat typical for the type of letter. Regardless of the received letters format, a response letter must be generated to comply with the respective regulatory and statutory requirements. However, differences between fonts, pagination, style settings and the like limit the amount of automation that may be applied to the large volume of documents received by the enterprise. If the different types of received documents warrant a response, it may be difficult to produce a template for each different type because the format of the received documents may change.

The above deficiencies and others exist. Accordingly, there is a need to provide systems and techniques for processing the large volume of documents and easing the burden of agents having to review individual documents.

SUMMARY

Aspects of the disclosed technology include systems and methods for identifying a common theme between documents and selecting a response document template enabling expeditious generation of an appropriate response to a notification letter received by an enterprise.

Disclosed is an example of a method. The method includes a step of recognizing alphanumeric characters in a notification document received by an enterprise. The alphanumeric characters may be recognized using an optical character recognition algorithm. Patterns of alphanumeric characters may be identified in the recognized alphanumeric characters. The identified patterns may be stored as a collection of alphanumeric character patterns in a memory. A corpus of classified notification documents may be accessed. Each classified notification document in the corpus may be assigned a common theme and includes a group of alphanumeric character patterns. The collection of alphanumeric character patterns may be iteratively compared to the group of alphanumeric character patterns in each respective classified notification document in the corpus. Based on a result of each comparison of the collection of alphanumeric character patterns in the received notification document to the group of alphanumeric character patterns in each respective classified notification document of the corpus, a respective cosine similarity rating between the received document and each respective classified notification document in the corpus may be determined. Each respective cosine similarity rating may indicate a degree of similarity between each respective classified notification document in the corpus and the collection of alphanumeric characters patterns from the received notification document. One classified notification document of the corpus may be identified as having a cosine similarity rating that exceeds a predetermined similarity threshold as matching the received notification document. A common theme may be assigned to the received notification document. The assigned common theme may be a same common theme as assigned to the identified one classified notification document.

Also disclosed is an example of a system that may include a document repository, a document text delivery component, a model text component, and a document analytics. The document repository may store a number of electronic documents related to a number of notification documents received by an enterprise as well as a number of document templates including notification response documents to be sent in response to at least one of the notification documents received by the enterprise. The document text delivery component may be coupled to the document repository, and operable to access the document repository. The model text component may be coupled to the document text delivery component and to the document analytics component. The document text delivery component may be operable to deliver the number of electronic documents to the model text component for processing. The model text component may be operable to identify, by processing machine-readable data in each electronic document, a common theme between two or more of the plurality of each electronic documents delivered by the document text delivery component. The model text component may group each electronic document identified as having the common theme in a notification document corpus. The document analytics component may be operable to receive the notification document corpus from the model text component. The model text component may analyze the notification document corpus with reference to the notification documents stored in the document repository. Based on results of the analysis, the model text component may select a template of a notification response document appropriate for responding to a specific notification document received by the enterprise.

An example of a non-transitory computer-readable storage medium may also be disclosed. The non-transitory computer-readable storage medium may store computer-readable program code executable by a processor. The execution of the computer-readable program code may cause the processor to identify, by processing machine-readable data of a number of notification documents, a common theme between two or more notification documents of the number of notification documents. Each notification document in the number of notification documents is received by an enterprise, and the identified common theme relates to a subject of at least one notification document of the number of notification documents. The processor may store in a memory notification documents identified as sharing the common theme stored. The identified notification documents may form a corpus of notification documents related to the common theme. Similar machine-readable data from each notification document may be identified in the corpus of notification documents. According to a clustering algorithm, notification documents may be grouped in the stored corpus having the identified similar machine-readable data in a respective cluster of a number of clusters until all notification documents in the stored corpus have been grouped into a respective cluster. For each respective cluster of the number of clusters, an intrinsic similarity value of notification documents grouped in each respective cluster may be determined. wherein the intrinsic similarity value is based on a mean value of a cosine similarity between machine-readable data of pairs of notification documents in each respective cluster of the plurality of clusters. A cluster having a pair of notification documents with a highest intrinsic similarity value may be removed from the number of clusters. The grouping, determining and removing may be repeated until the grouping, determining and removing fails to produce another cluster having a highest intrinsic similarity value. Based on the identified similar machine-readable data of each notification document in the removed clusters stored in the removed cluster data storage, a response document template appropriate for responding to notification documents received by the enterprise that share the common theme may be selected.

BRIEF DESCRIPTION OF THE DRAWINGS

FIG. 2 illustrates a flowchart of an example process for a selecting a response document template to respond to a communication received by an enterprise.

FIG. 3 illustrates a flowchart of another process example for building corpus and using the corpus a selecting a response document template utilizing a clustering algorithm.

FIGS. 5A-5C illustrate examples of respective apparatuses operable to provide process functions that enable the selection of a response document template.

DETAILED DESCRIPTION

Figure 1:
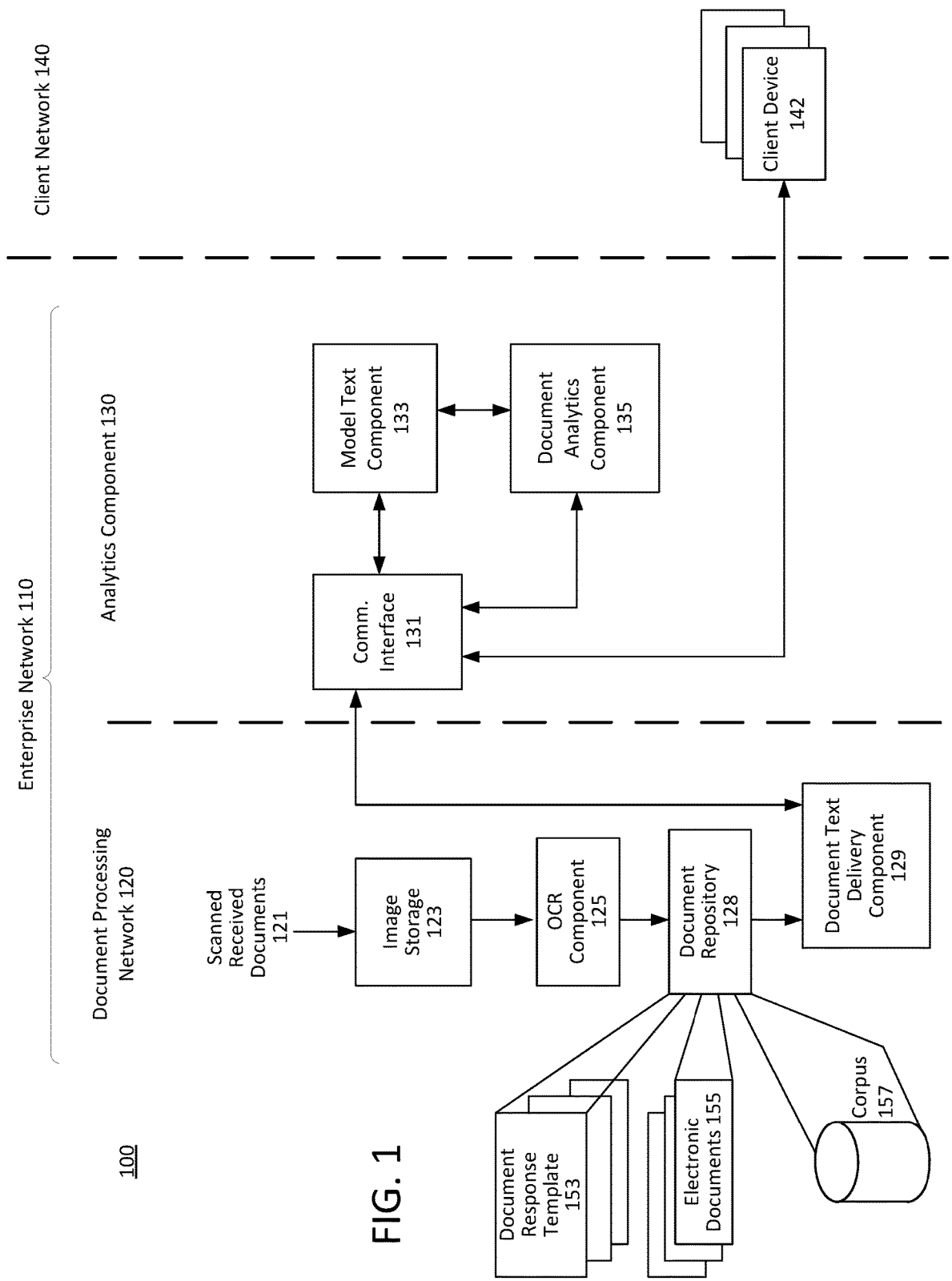
FIG. 1 illustrates an example of a system to process, analyze and deliver response recommendation and response templates according to the examples described herein.

Various examples are generally directed to techniques and apparatuses for selecting a response document template from a number of different response document templates that is appropriate for responding to a notification document received by an enterprise. The notification document may be a physical letter received from a post office or document delivery service, a letter received by facsimile, an attachment to an email, an email, a letter received via a mobile computer application, or the like. The subject matter of the letter may be a credit error report, an account related letter (e.g., close my account, my account was overdrawn, or the like), an identity theft report, a customer death notice or the like. In addition, some of the received notification documents may require a response from the enterprise within a predetermined time period in order to comply with governmental regulations and statutes. For example, notification documents related to a credit report may invoke the Fair Credit Reporting Act which sets time frames for responding to such notification documents. in highly regulated businesses, notification documents related to other subjects may also invoke other statutes or regulations that trigger response deadlines. An enterprise, such as a financial institution, may receive a great number of notification documents that may or may not be related to credit reports or other timeframe-invoking documents, it is unreasonable to presume that a person or persons could evaluate each received document with the same standard of review to confirm that a response is required. In addition, the response document may need to be a response appropriate for the subject matter of the notification letter and to comply with an applicable statute or regulation.

The systems and apparatuses as described herein that apply the described rigorous techniques and methods enable a practical and advantageous solution that selects a response document template that shares a common theme with at least some of the many received notification documents and is also appropriate for responding to the received notification documents. The described systems, apparatuses, and techniques provide the advantages of measurable compliance with statutory or regulatory requirements, uniform evaluation of notification document subject matter, ease in updating notification document common theme evaluation criteria in response to statutory or regulatory amendments, or the like.

Reference is now made to the drawings, wherein like reference numerals are used to refer to like elements throughout. In the following description, for purpose of explanation, numerous specific details are set forth in order to provide a thorough understanding thereof. It may be evident, however, that the novel examples can be practiced without these specific details. In other instances, well-known structures and devices are shown in block diagram form to facilitate a description thereof. The intention is to cover all modification, equivalents, and alternatives within the scope of the claims.

FIG. 1 illustrates an example of a system 100 that evaluates communications received by an enterprise and selects a response document template.

The enterprise, which may maintain and operate the enterprise network 110, may receive many, e.g., hundreds or thousands, of communications from various sources, such as customers, vendors, governmental agencies or the like. The communications may, for example, be physical documents, such as letters, hard copies of facsimile documents, or postcards, electronic documents, such as email attachments, emails, or digitized facsimile documents, attachments or messages from a mobile computer application, or the like. Communications received by an enterprise may, in some circumstances, necessitate or warrant a response. In some instances, the response to the received communication may need to be sent immediately. For example, if a communication is complaining about service, a personnel problem or the like, the enterprise may wish to respond quickly to the communication. In a specific example, an enterprise may be statutorily required to respond to a communication, such as a communication disputing an item in a credit report or the like. To determine whether a response is necessary because of a statutory requirement or warranted to resolve a customer service issue, the received documents need to be analyzed to determine the subject matter of the document. To generate an appropriate response, it would be beneficial if the enterprise could determine a common theme of the received document. For example, a response document template selection process as described herein improves the processing of the notification documents by identifying frivolous or irrelevant documents and documents requiring a specific response and, based on the identification, providing agents with a response document template that allows the agent to generate an appropriate response letter to the notification document.

The document processing system 100 may include an enterprise network 110 and a client network 140. For example, the enterprise network 110 may include a document processing network 120 and an analytics component 130.

The document processing network 120 may include several components that are communicatively coupled to one another. In the document processing network 120, for example, an image storage 123, an optical character recognition (OCR) component 125, a document repository 128 and a document text delivery component 129 may be communicatively coupled in serial as shown in the example of FIG. 1 or may also be coupled together in various configurations.

The communications (i.e., notification documents) received by the enterprise may be digitized by a scanning system (not shown) that generates an electronic version of the notification document and delivers electronic versions of the notification documents to the document processing network 120 as scanned received documents 121. The scanned received documents 121 may be formatted as image files and may be delivered to an image storage 123.

Upon receipt of the scanned received documents 121 by the document processing network 120, the scanned received documents 121 may be stored in image storage 123. For example, the OCR component 125 may convert each respective notification document received by the enterprise into a respective electronic document by performing optical character recognition of text identified in a scanned copy of each respective notification document. The OCR component 125 may be operable to apply an optical character recognition algorithm, such as the Tesseract open source OCR engine or the like, to each document of the scanned received documents 121. The output of the OCR algorithm may be one or more vectors of numerical representation of the alphanumeric text in the respective document. The output of the OCR component 125 may be a vector, or a collection of vectors, that represent the optically recognized alphanumeric characters in the respective scanned document may be stored in the document repository 128. Within the collection of vectors, each alphanumeric character or group of alphanumeric characters (e.g., unigrams (one word), bigrams (two words or numbers) or the like) may have a separate vector that represents the respective letter or group of letters. The respective vectors may be compared to known vectors (e.g., "default" or "credit error" or the like) or vectors from other documents in the scanned received documents 121.

The document repository 128 may store many electronic documents related to a number of the notification documents received by an enterprise. The document repository 128 may also store multiple document templates including notification response document templates 153, electronic documents 155 generated by the OCR component 125 and a corpus of notification documents 157. The notification documents within the corpus of notification documents 157 may be classified based on a common theme of the respective notification document in the corpus. The response document templates 153 may be used to generate a notification response that may be sent in response to at least one of the notification documents received by the enterprise.

The document text delivery component 129 may be operable to access the document repository 128, for example, in response to a request from the analytics component 130 or a client device 142.

A communication interface 131 may communicatively couple components of the document processing network 120 with components of the analytics component 130. The communication interface 131 may be a wired or wireless communication pathway that enables the document processing network 120 and the analytics component 130 to communicate with one another. For example, the model text component 133 may be communicatively coupled via the communication interface 131 to the document text delivery component 129. In addition, the communication interface 131 may be communicatively coupled to at least one client device 142 within the client network 140, which enables the client device 142 to interact with the analytics component 130 and the document processing network 120.

Components of the analytics component 130 may be communicatively coupled to one another. For example, the communications interface 131 may be communicatively coupled to the document analytics component 135 and the model text component 133. The analytics component 130 provides benefits and advantages over previous systems by increasing and improving the document processing and analysis capabilities of the enterprise network 110 to enable the enterprise network 110 to make decisions related to an appropriate response to a received notification letter and to select an appropriate response document template to generate the appropriate response.

Each of the different components of the document processing network 120 and the analytics component 130 may perform functions to enable the determination and selection of a document response template for responding to a received document, such as a notification document or the like. For example, the document text delivery component 129 may be operable to deliver electronic documents, such as 155, via the communication interface 131 to the model text component 133 for processing. The model text component 133 may be operable to process each electronic document to identify a common theme between two or more of the electronic documents delivered by the document text delivery component 129. The model text component 133 may group each electronic document identified as having the common theme in a notification document corpus. Alternatively, and as explained with reference to other examples, the model text component 133 may identify patterns of alphanumeric characters in the recognized alphanumeric characters output from the OCR component 125 and stored in the document repository 128.

A common theme of the electronic document may be a categorization or characterization of the subject matter of the contents of the electronic document. For example, an electronic document received by the enterprise may notify the enterprise of an alleged error in the sender's credit report. Typically, credit report error notification documents use common terminology, word patterns or phrases (e.g., a reference line stating, "a credit report error," multiple uses of the word "error," "mistake" or the like) to bring the alleged errors to the attention of the enterprise. By identifying the common terms, word patterns or phrases, the system may categorize or characterize the document as being a related to a credit report error; therefore, a common theme of the document may be "a credit report error." Other examples of common themes in a financial example may be "mistaken withdrawal," "improper insufficient funds notice," "overpaid taxes," "close my account," "power of attorney," or the like. In other examples, such as an e-commerce situation, common themes may be "overcharged for an item," "the wrong item shipped," "damaged product" or the like. Other examples may also be envisioned, and an exhaustive list is not provided for ease of explanation. In addition, the system may be operable to identify duplicate documents and evaluate scanned copies of the physical response letters to ensure that the physical response letter includes all the legal disclaimers, relevant paragraphs or the like. The examples described herein may be extended to handwriting recognition, such as check signature validation or the like.

As part of the analytics component 130, the document analytics component 135 may be operable to receive or access the notification document corpus, such as 157, from the model text component 133. The notification document corpus 157 may be analyzed by the model text component 133 with reference to the optically recognized notification documents stored in the document repository 128. Based on the results of the analysis, a template of a notification response document appropriate for responding to a specific notification document received by the enterprise may be selected by the document analytics component 135. In response to selecting the template, the document analytics component 135 may forward the selected template to a client device 142 as a link or as an attachment to a message. Alternatively, or in addition, the document analytics component 135, the client device 142 or another component of system 100 may generate an automated notification response document responsive to a received notification document having the common theme using the selected template of the notification response document in response to the selection of the template of the notification response document. The generated automated response document may be based on the selected response document template. For example, the selected template of the notification response document may only require minimal information for generating an appropriate response.

Examples are not limited in this manner, and the degree or level of certainty and actions performed may be configurable by a user and/or one or more components of the document processing system 100.

In examples, the document processing system 100 and the respective components of the document processing system 100 may include a number of components, devices, and so forth operable to perform multiple functions and operations.

FIG. 2 illustrates a flowchart of an example process for selecting a response document template to respond to a communication received by an enterprise. As mentioned, an enterprise may receive a number of documents that need to be read and responded to by an agent of the enterprise. As shown in the example of FIG. 1, the received documents are converted or transformed into an electronic document by an image scanning device, such as those provided by companies such as Canon, HP or the like. In the example process 200 at 210, the alphanumeric characters in a notification document received by an enterprise are recognized. For example, the respective scanned received documents, such as 121 of FIG. 1, that are electronic documents may be stored as image files in the image storage 123. For example, the alphanumeric characters in the stored image files may be processed by the optical character recognition (OCR) component 125, which may be a dedicated device or may be an OCR algorithm executing on a processing device, such as a processor or the like (as described with reference to later examples). At 220, patterns of alphanumeric characters may be identified by a processor in the recognized alphanumeric characters of each scanned document. The identified patterns of alphanumeric characters from each document may be stored as a collection of alphanumeric character patterns in a memory, such as a document repository 128 of FIG. 1. The collection of alphanumeric character patterns may be stored, for example, as a vector representation of the alphanumeric character patterns, a list of alphanumeric character patterns, or the like.

A processor may access a corpus of classified notification documents (230). A corpus, such as 157 of FIG. 1, may be a large sample of electronic versions of classified notification documents with each of the classified notification documents containing a group of alphanumeric characters. In an example, each classified notification document in the corpus may be classified, for example, based on a group of alphanumeric character patterns within the classified notification document that indicate that the notification document has a common theme (as discussed above). The processor may assign the common theme to the notification document. The alphanumeric character patterns within the group of alphanumeric characters have been identified as single words (e.g., "bank," "overdue," or the like), multiple words (e.g., n-grams, such as a bigram, digram, trigrams, or the like), phrases, sentences, numbers (e.g., zip code or post office box), or the like.

The collection of alphanumeric character patterns may be compared to the group of alphanumeric character patterns in each respective classified notification document in the corpus (240). The comparison of the collection of alphanumeric character patterns to the group of alphanumeric character patterns in each respective classified notification document in the corpus may be performed iteratively or in parallel.

A respective cosine similarity rating between the received document and each respective classified notification document in the corpus may be determined based on a result of the comparison of the collection of alphanumeric character patterns in the received notification document to the group of alphanumeric character patterns in each respective classified notification document of the corpus. For example, the comparison may be based on a vector representation of the alphanumeric character patterns in the received notification documents to corpus vector representations in the group of alphanumeric character patterns in each respective classified notification document of the corpus. In the example of an iterative comparison, the cosine similarity rating determination may be made based on each comparison result (250). Each respective cosine similarity rating may indicate a degree of similarity between each respective classified notification document in the corpus and the collection of alphanumeric characters patterns from the received notification document.

The processing device may identify one classified notification document of the corpus as having a cosine similarity rating that exceeds a predetermined similarity threshold as a match to the received notification document (260). Of course, the match at 260 does not have to be an exact match (i.e., 100% probability of a match). For example, the identifying at 260 may include comparing each determined respective cosine similarity rating to a predetermined similarity threshold. The predetermined similarity threshold may have a threshold value of, for example, approximately 0.85, approximately 0.80, approximately 0.90 or the like. Alternatively, the predetermined similarity threshold may have, for example, a range of threshold values, such as approximately 0.82-0.86, approximately 0.80-0.90, approximately 0.60-0.85, or the like. For example, a classified document associated with a highest determined respective cosine similarity rating may be selected. In such an example, the predetermined similarity threshold may be the highest determined respective cosine similarity rating that has a greatest cosine similarity rating value regardless of whether the highest determined respective cosine similarity rating exceeds or equals the predetermined similarity threshold. In an example, the foregoing predetermined threshold values may be changed to allow for use of more general document response templates by identifying a greater number of documents as being similar or, conversely, to allow for use of more detailed document response templates by identifying a lesser number of documents as being similar. This is but one advantage of the described examples.

At 270, a common theme may be assigned to the received notification document by the processor. In this example, the common theme assigned to the received notification document is the same common theme as assigned to the identified one classified notification document. In some examples, a common theme associated the identified one classified notification document may be selected based on the common theme of the classified document that is identified as exceeding the predetermined similarity threshold or that is associated with the highest determined respective cosine similarity rating.

In some examples, the process 200 may also include additional steps. In one example, a document response template may be identified for generating a response to the received notification document based on the common theme assigned to the received notification document. The document response template may be related to the common theme and may include text that enables a prompt response letter to be generated in response to a received notification document. In some examples, in response to the identification of the document response template, the identified document response template may be forwarded directly to a client device for generation of the response letter. In another example, the received document may be identified as a generic letter, such as a letter without enough information, or incomplete or improper information to generate an appropriate response letter. In response to an identified generic letter, the process 200 may configure a computing device to automatically generate and have sent a general response letter or the like to a sender of the received notification document.

The foregoing process example offers advantages, such as the elimination of subjectivity in determining a theme of a notification document, providing a uniform decision process, and improves the accuracy of a notification document response system in generating an appropriate response to a received notification document that complies with governmental statutes and regulations.

The corpus of classified notification documents may be produced from samples of classified notification documents. The corpus may be formed using various techniques. An example of one technique may utilize a clustering algorithm. In a clustering algorithm example, the classified notification documents in the corpus may be arranged in clusters within the corpus by a clustering algorithm executing on a computing device. It may be helpful to explain an example that utilizes a clustering algorithm.

FIG. 3 illustrates a flowchart for another process example for selecting a response document template to respond to a communication received by an enterprise that utilizes an example of a clustering algorithm. The process 300 of FIG. 3 may be implemented utilizing a computer processor that executes computer-readable program code executable stored on a non-transitory computer-readable storage medium.

In process 300, a processor by processing machine-readable data of a plurality of notification documents may identify a common theme between two or more notification documents of a number of notification documents (310). In the example, each of notification document in the plurality of notification documents is received by an enterprise, and the identified common theme may relate to a subject of at least one notification document of the number of notification documents.

At 320, notification documents identified as sharing the common theme may be stored in a memory. The identified notification documents may be used to form a corpus of notification documents related to the common theme. Similar machine-readable data from each notification document identified in the corpus of notification documents (330).

According to a clustering algorithm, the notification documents in the stored corpus having the identified similar machine-readable data may be grouped in a respective cluster of a plurality of clusters until all notification documents in the stored corpus have been grouped into a respective cluster (340). An example of a clustering algorithm suitable for use with the examples of FIGS. 1-3, 5A-5C and 6 may be DBSCAN, which is a density-based clustering algorithm, or the like.

In some examples, a parameter of the clustering algorithm (such as for optimization of the clustering algorithm) may be selected based on a common theme of a sample of notification documents. For example, received notification documents that are general inquiry letters (based on a common theme) may not use as stringent clustering so a less robust cluster algorithm that forms less dense clusters may be acceptable. In contrast, some received notification documents may be notification documents that require a response that complies with a government statute or regulation (based on a common theme) and may use very stringent clustering so a more robust cluster algorithm that forms denser clusters may be necessary. In such examples, the selected parameter may be a density measurement of a cluster. In other examples, the selected parameter may limit the number of clusters, an amount of time that the clustering may be applied to a sample of notification documents, or the like.

In the process 300, the clusters may indicate a separate common theme and membership in a cluster is based on an intrinsic similarity value between pairs of classified documents within the cluster. The intrinsic similarity may, for example, be based on a mean value of a cosine similarity between machine-readable data of pairs of notification documents, such as previously received documents in each respective cluster of the number of clusters.

At the 350, the process 300 determines, for each respective cluster of the plurality of clusters, an intrinsic similarity value of notification documents grouped in each respective cluster. The determined intrinsic similarity values may be ordered from the highest (i.e., greatest) intrinsic similarity value to lowest intrinsic similarity value, or the like. A processor executing programming code may identify or determine which intrinsic similarity value of the determined intrinsic similarity values is highest. Alternatively, the intrinsic similarity value may be compared to an intrinsic similarity value threshold, such as 0.80, 0.85, 0.95 or some other value that indicates a high degree of similarity.

In response to the determination of a cluster having a pair of notification documents with a highest intrinsic similarity value, the cluster is removed from the number of clusters (360). Or, in another example, a cluster having an intrinsic similarity value that exceeds the intrinsic similarity value threshold may be removed.

At 370, the process 300 may inquire whether any cluster has a highest intrinsic value? If YES, the process returns to 340, otherwise, the process 300 continues to 380. In steps 360 and 370, the grouping, the determining and the removing may be repeated until the grouping, determining and removing fails to produce another cluster having a highest intrinsic similarity value as compared to any other cluster in the corpus. In an example, if there is doubt whether there are any clusters, a threshold value can be prescribed to test whether any cluster contains similar documents.

A common theme may be assigned to the cluster based on a characterization of the notification documents included in the cluster (380). In some examples after step 380, the applied clustering algorithm may group the classified notification documents in a cluster of the corpus based on the intrinsic similarity value. Alternatively, or in addition, a processor executing the clustering algorithm may, for example, merge clusters. The clustering algorithm may cause the processor to merge a first cluster of the corpus with a second cluster of the corpus when the intrinsic similarity of pairs of documents in each of the first cluster and the second cluster is not less than a factor of the intrinsic similarity of either cluster. Such a factor of the selected clustering parameter may be referred to as a density measurement of a cluster. For example, the selected clustering parameter may be a density measurement of a cluster of approximately 0.95, approximately 0.90, 0.85-0.95 or the like in each cluster, such as a first cluster and a second cluster. In some examples, the factor may be approximately 1.0. Merging may be defined as placing all notification documents in a respective pair of clusters in one single cluster based on the notification documents in the respective pair of clusters exceeding a threshold or an aggregate score for all notification documents in the respective pair of clusters exceeding a threshold, such as a mean or average intrinsic similarity value threshold or the like. An average intrinsic similarity value threshold may be, for example, 0.80-0.85, 0.85 or the like.

In another example, a processor or component may determine that two or more removed highest intrinsic similarity value clusters have an average intrinsic similarity that exceeds an average intrinsic similarity threshold. The two or more removed highest intrinsic similarity value clusters that are determined to exceed the average intrinsic similarity threshold may be merged to form a merged cluster. The notification documents in the merged cluster substantially represent the common theme. The "substantial representation" may be based, for example, on a highest intrinsic similarity value, a highest average intrinsic similarity value, an intrinsic similarity threshold value (e.g., 0.95, 0.85 or the like), an average intrinsic similarity threshold (e.g., the average is greater or equal to a value such as 0.95, 0.85 or the like), or the like.

In another example, the compared first and second cluster may be but one pair of many pairs of clusters. For example, two or more clusters, such as candidate clusters, the process may determine for all pairs of candidate clusters whether the clusters are to be merged. For example, if the intrinsic similarity of the joined documents in the pair is higher than 0.95 times the mean value of the intrinsic similarity of both clusters, merge the document members of the clusters. Repeat until no more merges are possible. Alternatively, for each candidate cluster, a comparison may be made of the average (or mean) intrinsic similarity between all notification documents in the candidate cluster (e.g., first cluster) and the known predefined cluster (e.g., the second cluster) is calculated. This comparison may be performed on several clusters in addition to the first cluster, where each cluster compared to the known predefined cluster would be considered a candidate cluster. The merging of the clusters may, in this alternative example, be based on the average (or mean) intrinsic similarity between all notification documents in the first cluster (i.e., candidate cluster) and the second cluster (i.e., the known predefined cluster).

As part of the process 300, all of the merged candidate clusters that are part of the group of merged clusters may be compared to known templates the known template repository. Alternatively, a subset of the merged candidate clusters containing less than all of merged clusters may be compared to known templates in the known template repository.

The text information of each candidate cluster of the merged candidate clusters may be compared to text information of document templates stored, for example, in the document repository.

At 390, based on a result of the comparisons, a response document template that shares the common theme with the text information obtained from notification documents represented by one of the merged candidate clusters may be selected to provide an appropriate response to the notification documents received by the enterprise. For example, the comparison result may identify one of the candidate cluster having a closest similarity value to a response document template and considered as sharing the assigned common theme. Based on the result of the comparison that particular response document may be selected to be forwarded for generation of a response. In an example, a closest similarity value may be at least 0.95, or the like to selected response document template, both of which share an assigned common theme. The selected response document template may be forwarded to a client device (e.g., of an enterprise agent or the like) for generation of an appropriate response document to the received notification document. The client device, such as 142 of FIG. 1, may store the selected response document template in a memory coupled to the client device.

The clustering algorithm applied in steps 340-370 in the example of FIG. 3 may be an algorithm that provides a differentiation between the different types of notification letters. It may be helpful to describe an example of a clustering algorithm suitable for inclusion in the examples of FIGS. 1-3 with reference to the example of FIG. 4.

Figure 4:
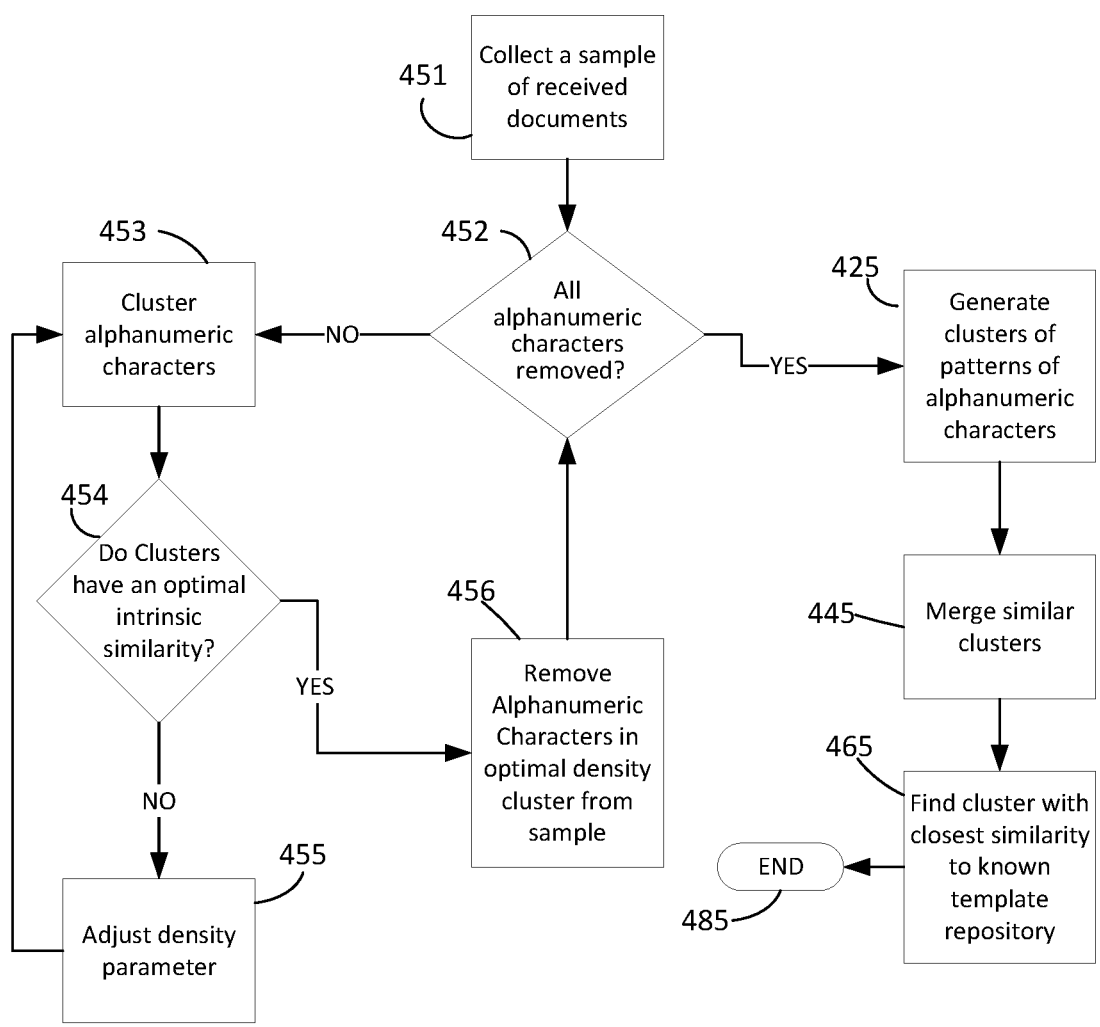
FIG. 4 illustrates a flowchart of an example of a clustering schema usable with a process selecting a response document template.

FIG. 4 illustrates a flowchart of an example of a clustering schema usable with a process selecting a response document template.

In the process 400, a sample of the received documents may be collected at 451. The sample of received documents may be like the scanned documents 121 of FIG. 1. A YES or NO determination of whether all the alphanumeric characters have been removed from the collection of sampled documents may be made at 452. In the example, in response to a NO determination at 452, the alphanumeric characters may be grouped into clusters (453). For example, the respective alphanumeric characters may be clustered according to a cosine similarity or other similarity determination. From 453, the process 400 proceeds a determination of whether the clusters have an optimal intrinsic similarity may be made. If the determination at 454 is NO, the clusters do not have an optimal intrinsic similarity. A density parameter of the clustering algorithm may be adjusted (455). For example, the clustering algorithm density parameter may be adjusted to increase the density of the clusters formed by the algorithm. The increased density thereby requires a greater similarity between the alphanumeric characters grouped in the clusters.

Alternatively, if the determination at 454 is YES, the clusters do have an optimal intrinsic similarity, the process 400 may proceed to step 456. At 456, the alphanumeric characters in the optimal density cluster are removed from the collected sample of received documents. After removal of the alphanumeric characters in the optimal density cluster from the collected sample, the process 400 returns to 452 to again determine whether all the alphanumeric characters have been removed from the collected sample of received documents. In response to a YES determination at 452, the process may proceed to 425. At 425, clusters of patterns of alphanumeric characters are generated. The generated clusters are evaluated to determine a similarity value between the clusters. The similarity value may be a cosine similarity value, a distance functions, such as Minkowski, Mahalanobis, or the like, or another similarity metric or value.

Clusters that are similar based on a predetermined similarity threshold, such as a distance threshold or tolerance values, may be merged with one another (445). At 465, the cluster with the closest similarity value to a known cluster within template repository is identified. The process 400 may end at 485. In some examples, the identified cluster may be associated with a known template letter. The clusters may be used to continue to train the clustering algorithm.

FIGS. 5A-5C illustrate examples of apparatuses operable to provide process functions that enable the selection of a response document template. The document text delivery apparatus 504, the model text apparatus 505 and the document analytics apparatus 506 include a number of components that may perform one or more operations as discussed herein. The document text delivery apparatus 504 includes one or more processor(s) 542, memory 544, one or more storage device(s) 546, one or more communication interface(s) 548, and one or more input/output (I/O) device(s) 541. The one or more processor(s) 542 and communication interface(s) 548 may be integrated as part of a document text delivery component 540. Similarly, the model text apparatus 505 includes one or more processor(s) 553, memory 555, one or more storage device(s) 557, one or more communication interface(s) 558, and one or more I/O device(s) 551. The one or more processor(s) 553 and communication interface(s) 558 may be integrated as part of a model text component 550. Likewise, the document analytics apparatus 506 includes one or more processor(s) 562, memory 564, one or more storage device(s) 566, one or more communication interface(s) 568, and one or more I/O device(s) 561. The one or more processor(s) 562 and communication interface(s) 568 may be integrated as part of a document analytics component 560.

In examples of the document text delivery apparatus 504, the document text delivery component 540 may be a processing system that includes one or more servers or computing devices that are interconnected via one or more network links, e.g., wired, wireless, fiber, etc. In some instances, the document text delivery apparatus may be a distributed computing system. Each of the servers may include one or more processor(s) 542, which may include one or more processing cores to process information and data. Moreover, the one or more processor(s) 542 can include one or more processing devices, such as a microprocessor manufactured by Intel™, AMD™, or any of various processors. The disclosed examples are not limited to any type of processor(s).

Memory 544 can include one or more memory (volatile or non-volatile) devices configured to store instructions used by the one or more processor(s) 542 to perform one or more operations consistent with the disclosed examples. For example, memory 544 can be configured with one or more software instructions, such as programs that can perform one or more operations when executed by the one or more processor(s) 542.

The disclosed examples are not limited to separate programs or computers configured to perform dedicated tasks. For example, memory 544 can include a single program that performs the operations or could comprise multiple programs. Memory 544 can also store data that can reflect any type of information in any format that the system can use to perform operations consistent with the disclosed examples.

In examples of 5A-5C, the document text delivery apparatus 504, model text apparatus 505 and document analytics apparatus 506 may, respectively, include one or more storage device(s), such as 546, 557 and 566, respectively. The one or more storage device(s) 546, 557 and 566 may include HDDs, flash memory devices, optical storage devices, floppy storage devices, etc. In some instances, the storage device(s) 546, 557 and 566 may include cloud-based storage devices that may be accessed via a network interface. In some examples, the storage device(s) 546, 557 and 566 may be configured to store one or more databases and/or as a distributed database system to store information and data. Databases can include one or more memory devices that store information and are accessed and/or managed through the respective apparatus, i.e., document text delivery apparatus 504, model text apparatus 505 and document analytics apparatus 506. By way of example, databases can include Oracle™ databases, Sybase™ databases, or other relational databases or non-relational databases, such as Hadoop sequence files, HBase, or Cassandra. The databases or other files can include, for example, data and information related to the source and destination of a network request, the data contained in the request, transaction information, etc. Systems and methods of disclosed examples, however, are not limited to separate databases. In one aspect, the respective apparatuses (e.g., document text delivery apparatus 504, model text apparatus 505 or document analytics apparatus 506) may include databases located remotely from the respective apparatuses (i.e., document text delivery apparatus 504, model text apparatus 505 or document analytics apparatus 506). The databases can include computing components (e.g., database management system, database server, etc.) configured to receive and process requests for data stored in memory devices of databases and to provide data from databases.

The document text delivery apparatus 504 may include one or more communication interfaces 548 that may include one or more digital and/or analog communication devices that allow the document text delivery apparatus 504 to communicate with other machines and devices, such as the model text apparatus 505 and the document analytics apparatus 506. The one or more communication interfaces 548 can communicate via any type of connection, e.g., wired, wireless, optical, and so forth. These communication interfaces 548 may include network adapters and/or modems to communicate with the model text apparatus 505 and the document analytics apparatus 506. Examples are not limited in this manner.

The document text delivery apparatus 504 may also include one or more I/O devices 541, such as a mouse, keyboard, camera, microphone, etc. Other I/O devices may include USB devices, CD/DVD/Blu-ray devices, SD card devices, display devices, and so forth.

FIG. 5B illustrates an example of an apparatus that implements the functions of a model text apparatus 505. As mentioned, the model text apparatus 505 includes a model text component 550 that may have one or more processor(s) 553 and one or more communication interface(s) 558, memory 555, one or more storage device(s) 557, and one or more I/O device(s) 551.

In examples, the model text component 550 may be a processing system that includes one or more servers or computing devices that are interconnected via one or more network links, e.g., wired, wireless, fiber, etc. In some instances, the document text delivery apparatus 505 may be a distributed computing system. Each of the servers may include one or more processor(s) 553, which may include one or more processing cores to process information and data. Moreover, the one or more processor(s) 553 can include one or more processing devices, such as a microprocessor manufactured by Intel™, AMD™, or any of various processors. The disclosed examples are not limited to any type of processor(s).

Memory 555 can include one or more memory (volatile or non-volatile) devices configured to store instructions used by the one or more processor(s) 553 to perform one or more operations consistent with the disclosed examples. For example, memory 555 can be configured with one or more software instructions, such as programs that can perform one or more operations when executed by the one or more processor(s) 553.

The disclosed examples are not limited to separate programs or computers configured to perform dedicated tasks. For example, memory 555 can include a single program that performs the operations or could comprise multiple programs. Memory 555 can also store data that can reflect any type of information in any format that the system can use to perform operations consistent with the disclosed examples.

The model text apparatus 505 may include one or more communication interface(s) 558 that may include one or more digital and/or analog communication devices that allow the model text apparatus 505 to communicate with other machines and devices, such as the document text delivery apparatus 504 and the document analytics apparatus 506. The one or more communication interface(s) 558 can communicate via any type of connection, e.g., wired, wireless, optical, and so forth. These communication interface(s) 558 may include network adapters and/or modems to communicate with the model text apparatus 505 and the document analytics apparatus 506. Examples are not limited in this manner.

The model text apparatus 505 may also include one or more I/O devices 551, such as a mouse, keyboard, camera, microphone, etc. Other I/O devices may include USB devices, CD/DVD/Blu-ray devices, SD card devices, display devices, and so forth.

In examples, the model text apparatus 505 of FIG. 5B and the document analytics apparatus 506 of FIG. 5C include similar devices or components as the document text delivery apparatus 504. For the sake of brevity, a detailed discussion of all the devices or components of document analytics apparatus 506 that are like document text delivery apparatus 504 and model text apparatus 505 will not be made. The similar devices or components perform similar operations and functions that may or may not be specific to the function or operation of the respective devices or components of the document text delivery apparatus 504 and the model text apparatus 505.

As mentioned, the document analytics apparatus 506 may include one or more processor(s) 562, memory 564, one or more storage device(s) 566, one or more communication interface(s) 568, and one or more I/O device(s) 561. The one or more processor(s) 562 and communication interfaces 568 may be integrated as part of a document analytics component 560. Coupled to the document analytics component 560 may be a memory 564, one or more storage device(s) 566, and I/O devices 561. In this example, the document analytics component 560 may be a processing system that includes one or more servers or computing devices that are interconnected via one or more networking links, e.g., wired, wireless, fiber, etc. and is capable of processing information and data from the document text delivery apparatus 504 and model text apparatus 505. In some instances, the document analytics apparatus 506 may also be a distributed computing system. Each of the servers may include one or more processor(s) 562, which may include one or more processing cores to process information and data. The document analytics apparatus 506 also includes memory 564, which may be like and/or the same as memory 555 of the model text apparatus 505. Memory 564 can include one or more memory (volatile or non-volatile) devices configured to store instructions used by the one or more processor(s) 562 to perform one or more operations consistent with the disclosed examples.

In examples, the document analytics apparatus 506 may include one or more storage device(s) 566. In addition to those storage devices mentioned above, in some instances, the storage device(s) 566 may include cloud-based storage devices that may be accessed via a network interface. In some examples, the storage device(s) 566 may be configured to store one or more databases and/or as a distributed database system to store information and data.

The document analytics apparatus 506 includes one or more communication interface(s) 568 that may include one or more digital and/or analog communication devices that allow the document analytics apparatus 506 to communicate with other machines and devices, such as document text delivery apparatus 504 or model text apparatus 505. The one or more communication interface(s) 568 can communicate via any type of connection, e.g., wired, wireless, optical, and so forth. These interface(s) 568 may include network adapters and/or modems to communicate with the document text delivery apparatus 504 or the model text apparatus 505. Examples are not limited in this manner.

The document analytics apparatus 506 may also include one or more I/O devices 561, such as a mouse, keyboard, camera, microphone, etc. Other I/O devices may include USB devices, CD/DVD/Blu-ray devices, SD card devices, display devices, and so forth.

The document analytics component 560 of the apparatus 506 may be operable to perform additional functions. For example, the document analytics component 560 may reapply the clustering algorithm as discussed above with respect to the example of FIG. 3 to the notification document corpus to generate additional candidate clusters. The additional candidate clusters may be grouped with previous candidate clusters to form a group of final candidate clusters. For example, when no further additional candidate clusters are generated, an average similarity value between documents in each of the final candidate clusters may be determined. In an alternative example, the document analytics component 560 may determine that two or more of the candidate clusters in a number of removed clusters have an intrinsic similarity that exceeds an intrinsic similarity threshold and may merge the two or more candidate clusters that exceed the intrinsic similarity threshold. The document analytics component 560 may select a match cluster from the group of final candidate clusters. In an example, the match cluster has the highest average similarity value with the documents that represent the common theme. Alternatively, the document analytics component 560 may be further operable to perform a linear optimization during application of the clustering algorithm to produce a candidate cluster having a highest intrinsic similarity value of intrinsic similarity values generated for each cluster in the number of clusters.

Figure 6:
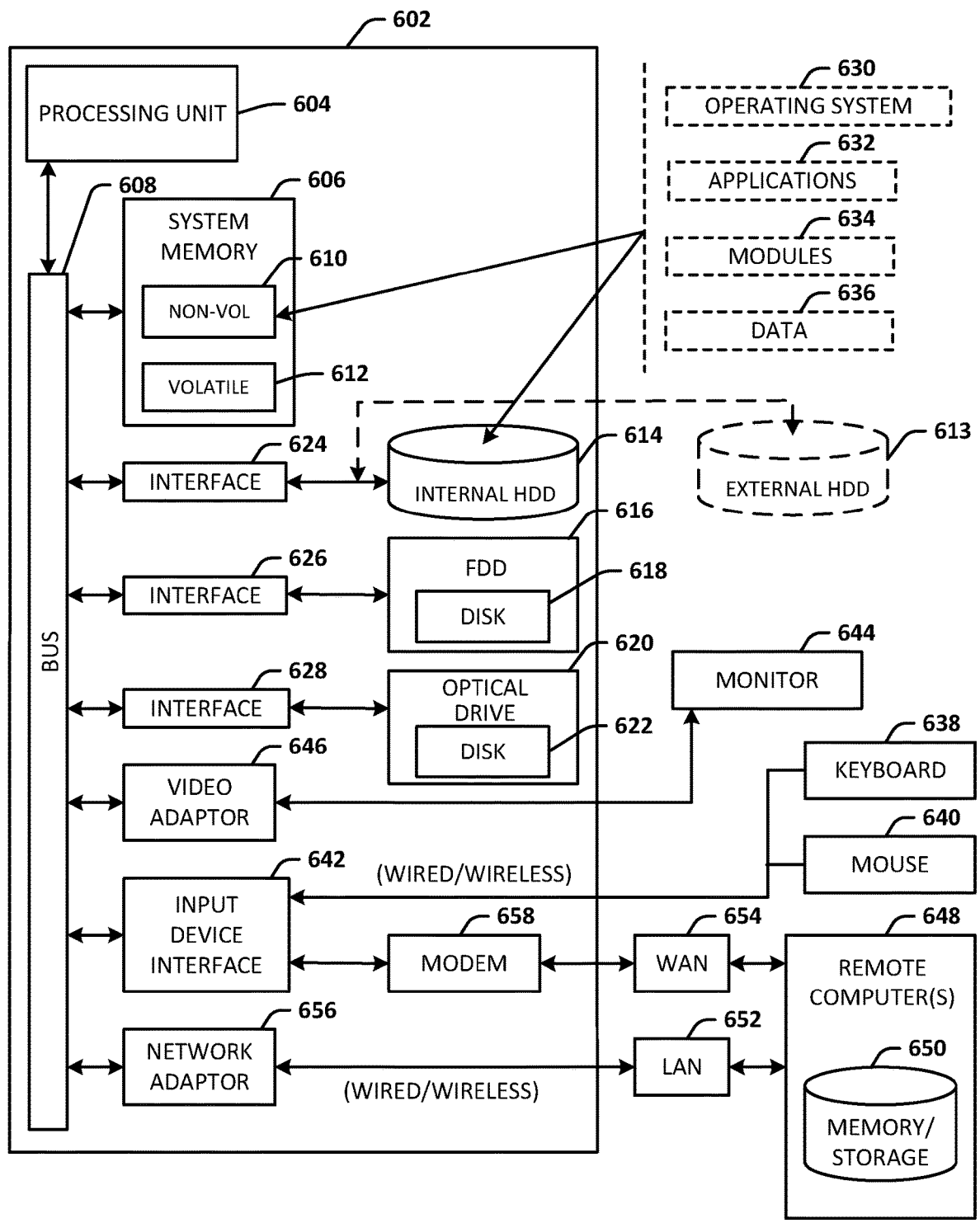
FIG. 6 illustrates an example of a computing architecture suitable for implementing the examples illustrated in FIGS. 1-5C.

FIG. 6 illustrates an example of a computing architecture 600 suitable for implementing various examples as previously described. In one example, the computing architecture 600 may include or be implemented as part of document processing system 100.

As used in this application, the terms "system" and "component" are intended to refer to a computer-related entity, either hardware, a combination of hardware and software, software, or software in execution, examples of which are provided by the computing architecture 600. For example, a component can be, but is not limited to being, a process running on a processor, a processor, a hard disk drive, multiple storage drives (of optical and/or magnetic storage medium), an object, an executable, a thread of execution, a container, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further examples, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The examples, however, are not limited to implementation by the computing architecture 600.

As shown in FIG. 6, the computing architecture 600 includes a processing unit 604, a system memory 606 and a system bus 608. The processing unit 604 can be any of various commercially available processors.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 600 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Examples may also be at least partly implemented as instructions contained in or on a non-transitory computer-readable medium, which may be read and executed by one or more processors to enable performance of the operations described herein.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated example shown in FIG. 6, the system memory 606 can include non-volatile memory 610 and/or volatile memory 612. A basic input/output system (BIOS) can be stored in the non-volatile memory 610.

The computer 602 may include various types of computer-readable storage media in the form of one or more lower speed memory units, including an internal hard disk drive (HDD) 614 (or external hard disk drive (HDD) 613), a magnetic floppy disk drive (FDD) 616 to read from or write to a removable magnetic disk 618, and an optical disk drive 620 to read from or write to a removable optical disk 622 (e.g., a CD-ROM or DVD). The HDD 614 or 613, FDD 616 and optical disk drive 620 can be connected to the system bus 608 by an HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of computer program modules can be stored in the drives and memory 610, 612, including an operating system 630, one or more application programs 632, other program modules 634, and program data 636. In one example, the one or more application programs 632, other program modules 634, and program data 636 can include, for example, the various applications and/or components of the computing architecture 600.

A user can enter commands and information into the computer 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 604 through an input device interface 642 that is coupled to the system bus 608 but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654 or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-5 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may be described using the expression "one example" or "an example" along with their derivatives. These terms mean that a feature, structure, or characteristic described in connection with the example is included in at least one example. The appearances of the phrases "in an example," "in one example," or the like in various places in the specification are not necessarily all referring to the same example. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

Some examples may be described using the expression "coupled" and "connected" along with their derivatives. These terms are not necessarily intended as synonyms for each other. For example, some examples may be described using the terms "connected" and/or "coupled" to indicate that two or more elements are in direct physical or electrical contact with each other. The term "coupled," however, may also mean that two or more elements are not in direct contact with each other, but still co-operate or interact with each other.

Various examples also relate to apparatus or systems for performing these operations. This apparatus may be specially constructed for the described purpose and may be selectively activated or reconfigured by a computer program stored in the computer. The procedures presented herein are not inherently related to a particular computer or other apparatus. The appropriate structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the term "including" is used as the plain-English equivalent of the respective term "comprising." Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel apparatus, processes and architecture are intended to embrace all such alterations, modifications and variations that fall within the spirit and scope of the appended claims.

What is claimed is:

1. A method, comprising:
   identifying, by processing machine-readable data of a plurality of notification documents, a common theme between two or more notification documents of the plurality of notification documents, wherein:
     each notification document in the plurality of notification documents is received by an enterprise, and
     the identified common theme relates to a subject of at least one notification document of the plurality of notification documents;
   identifying notification documents that share the identified common theme, wherein the identified notification documents form a corpus of notification documents related to the identified common theme;
   identifying machine-readable data that is similar from each notification document in the corpus of notification documents;
   grouping, according to a clustering algorithm, notification documents in the corpus having the identified similar machine-readable data in a respective cluster of a plurality of clusters until all notification documents in the corpus of the notification documents related to the identified common theme have been grouped into the respective cluster;
   determining, for each respective cluster of the plurality of clusters, an intrinsic similarity value of notification documents grouped in each respective cluster, wherein the intrinsic similarity value is based on a mean value of a cosine similarity between machine-readable data of pairs of notification documents in each respective cluster of the plurality of clusters;
   removing a highest intrinsic similarity value cluster from the plurality of clusters, wherein the highest intrinsic similarity value cluster has a pair of notification documents with a highest intrinsic similarity value;
   determining that two or more removed highest intrinsic similarity value clusters have an average intrinsic similarity that exceeds an average intrinsic similarity threshold;
   merging the two or more removed highest intrinsic similarity value clusters that are determined to exceed the average intrinsic similarity threshold to form a merged cluster, wherein the notification documents in the merged cluster substantially represent the common theme;
   repeat the grouping, determining removing and merging until the grouping, determining removing and merging fails to produce another cluster having a highest intrinsic similarity value of remaining clusters in the plurality of clusters; and
   selecting from the merged cluster a response document template appropriate for responding to notification documents received by the enterprise that share the common theme.

2. The method of claim 1, wherein a received notification document shares the common theme with the selected response document template.

3. The method of claim 1, further comprising:
   converting text of each respective notification document of the plurality of the notification documents into an electronic document.

4. The method of claim 1, further comprising:
   delivering the selected response document template to a client device.

5. The method of claim 1, further comprising:
   in response to the selection of the response document template, generating an automated response document based on the selected response document template as a response to at least one of the notification documents received by the enterprise having the common theme.

6. A non-transitory computer-readable storage medium storing computer-readable programming code executable by a processor, wherein execution of the computer-readable programming code causes the processor to:
   identify, by processing machine-readable data of a plurality of notification documents, a common theme between two or more notification documents of the plurality of notification documents, wherein:
     each notification document in the plurality of notification documents is received by an enterprise, and
     the identified common theme relates to a subject of at least one notification document of the plurality of notification documents;
   identify notification documents that share the identified common theme, wherein the identified notification documents form a corpus of notification documents related to the identified common theme;
   identify machine-readable data that is similar from each notification document in the corpus of notification documents;
   group, according to a clustering algorithm, notification documents in the corpus having the identified similar machine-readable data in a respective cluster of a plurality of clusters until all notification documents in the corpus of the notification documents related to the identified common theme have been grouped into the respective cluster;
   determine, for each respective cluster of the plurality of clusters, an intrinsic similarity value of notification documents grouped in each respective cluster, wherein the intrinsic similarity value is based on a mean value of a cosine similarity between machine-readable data of pairs of notification documents in each respective cluster of the plurality of clusters;
   remove a highest intrinsic similarity value cluster from the plurality of clusters, wherein the highest intrinsic similarity value cluster has a pair of notification documents with a highest intrinsic similarity value;

determine that two or more removed highest intrinsic similarity value clusters have an average intrinsic similarity that exceeds an average intrinsic similarity threshold;

merge the two or more removed highest intrinsic similarity value clusters that are determined to exceed the average intrinsic similarity threshold to form a merged cluster, wherein the notification documents in the merged cluster substantially represent the common theme;

repeat the grouping, determining removing and merging until the grouping, determining removing and merging fails to produce another cluster having a highest intrinsic similarity value of remaining clusters in the plurality of clusters; and select from the merged cluster a response document template appropriate for responding to notification documents received by the enterprise that share the common theme.

7. The non-transitory computer-readable storage medium of claim 6, wherein a received notification document shares the common theme with the selected response document template.

8. The non-transitory computer-readable storage medium of claim 6, wherein the execution of the computer-readable programming code causes the processor to:
convert text of each respective notification document of the plurality of the notification documents into an electronic document.

9. The non-transitory computer-readable storage medium of claim 6, wherein the execution of the computer-readable program code causes the processor to:
deliver the selected response document template to a client device.

10. The non-transitory computer-readable storage medium of claim 6, wherein the execution of the computer-readable programming code causes the processor to:
in response to the selection of the response document template, generate an automated response document based on the selected response document template as a response to at least one of the notification documents received by the enterprise having the common theme.

11. A system, comprising:
a memory storing instructions and a document repository including a plurality of electronic documents related to a plurality of notification documents received by an enterprise and a plurality of document templates including notification response documents to be sent in response to at least one of the notification documents received by the enterprise; and
a processor operable to execute the instructions stored in the memory, and when executing the instructions, the processor is operable to:
identify, by processing machine-readable data of a plurality of notification documents, a common theme between two or more notification documents of the plurality of notification documents, wherein:
each notification document in the plurality of notification documents is received by the enterprise, and
the identified common theme relates to a subject of at least one notification document of the plurality of notification documents;
identify notification documents that share the identified common theme, wherein the identified notification documents form a corpus of notification documents related to the identified common theme;
identify machine-readable data that is similar from each notification document in the corpus of notification documents;
group, according to a clustering algorithm, notification documents in the corpus having the identified similar machine-readable data in a respective cluster of a plurality of clusters until all notification documents of the notification documents related to the identified common theme in the corpus have been grouped into the respective cluster;
determine, for each respective cluster of the plurality of clusters, an intrinsic similarity value of notification documents grouped in each respective cluster, wherein the intrinsic similarity value is based on a mean value of a cosine similarity between machine-readable data of pairs of notification documents in each respective cluster of the plurality of clusters;
remove a highest intrinsic similarity value cluster from the plurality of clusters, wherein the highest intrinsic similarity value cluster has a pair of notification documents with a highest intrinsic similarity value;
determine that two or more removed highest intrinsic similarity value clusters have an average intrinsic similarity that exceeds an average intrinsic similarity threshold;
merge the two or more removed highest intrinsic similarity value clusters that are determined to exceed the average intrinsic similarity threshold to form a merged cluster, wherein the notification documents in the merged cluster substantially represent the common theme;
repeat the grouping, determining, removing and merging until the grouping, determining, removing and merging fails to produce another cluster having a highest intrinsic similarity value of remaining clusters in the plurality of clusters; and
select, from the merged cluster, a response document template appropriate for responding to notification documents received by the enterprise that share the common theme.

12. The system of claim 11, wherein a received notification document shares the common theme with the selected response document template.

13. The system of claim 11, wherein the execution of the instructions causes the processor to:
convert text of each respective notification document of the plurality of the notification documents into an electronic document.

14. The system of claim 11, wherein the execution of the instructions causes the processor to:
deliver the selected response document template to a client device.

15. The system of claim 11, wherein the execution of the instructions causes the processor to:
generate, in response to the selection of the response document template, an automated response document based on the selected response document template as a response to at least one of the notification documents received by the enterprise having the common theme.

16. The system of claim 11, wherein the average intrinsic similarity threshold is based on the average intrinsic similarity between all notification documents in a first cluster and a second cluster.

17. The system of claim 16, wherein the first cluster is a candidate cluster, and the second cluster is a known predefined cluster.

18. The non-transitory computer-readable storage medium of claim 6, wherein the average intrinsic similarity threshold is based on the average intrinsic similarity between all notification documents in a first cluster and a second cluster.

19. The non-transitory computer-readable storage medium of claim 18, wherein the first cluster is a candidate cluster, and the second cluster is a known predefined cluster.

20. The method of claim 1, wherein the average intrinsic similarity threshold is based on the average intrinsic similarity between all notification documents in a first cluster and a second cluster.

\* \* \* \* \*